United States Patent [19]
Palmer et al.

[11] Patent Number: 4,514,057
[45] Date of Patent: Apr. 30, 1985

[54] FIBER OPTIC COUPLER ARRAY AND FABRICATION METHOD

[75] Inventors: John P. Palmer, Pomona; Phillip B. Ward, Jr., Brea, both of Calif.

[73] Assignee: General Dynamics Pomona Division, Pomona, Calif.

[21] Appl. No.: 333,955

[22] Filed: Dec. 23, 1981

[51] Int. Cl.³ .............................................. G02B 5/172
[52] U.S. Cl. ............................. 350/96.15; 350/96.16
[58] Field of Search ............... 156/637, 643; 250/227; 350/96.15, 96.16, 96.19, 96.20

[56] References Cited

U.S. PATENT DOCUMENTS

| | | | |
|---|---|---|---|
| 3,592,773 | 7/1971 | Müller | 156/637 |
| 3,777,149 | 12/1973 | Marcatili | 350/96.15 |
| 4,021,097 | 5/1977 | McMahon | 350/96.15 |
| 4,307,933 | 12/1981 | Palmer et al. | 350/96.16 |

FOREIGN PATENT DOCUMENTS

| | | | |
|---|---|---|---|
| 3038048 | 10/1981 | Fed. Rep. of Germany | 350/96.15 |
| 24539 | 2/1977 | Japan | 350/96.15 |
| 91752 | 11/1978 | Japan | 350/96.15 |

Primary Examiner—William L. Sikes
Assistant Examiner—Frank González
Attorney, Agent, or Firm—Henry M. Bissell; Edward B. Johnson

[57] ABSTRACT

An assembly of fiber optic couplers of substantially identical form in an integrated array comprising two sets of optical fibers arranged side by side across an arcuate surface, epoxied in place, and lapped to develop mating planar surfaces which expose at least partially lapped portions of the respective optical fibers. Preferably, a launch coupler array is provided in which one set of optical fibers is of smaller diameter than those of the other set and is lapped to a depth sufficient to sever the fiber cores. The two lapped faces are then aligned so that one set of severed ends of the smaller fibers is joined with the exposed core portions of the other set of fibers. Selection of fiber size and lapping of the second set of fibers is performed to develop opposed mating portions of individual fibers which are substantially equal in extent and dimensions. After preparation of the two sets of fibers, the mating flat surfaces are joined together and proper alignment is achieved by monitoring light through two couplers at opposite sides of the array until the light transfer is maximized.

28 Claims, 13 Drawing Figures

Fig. 1.
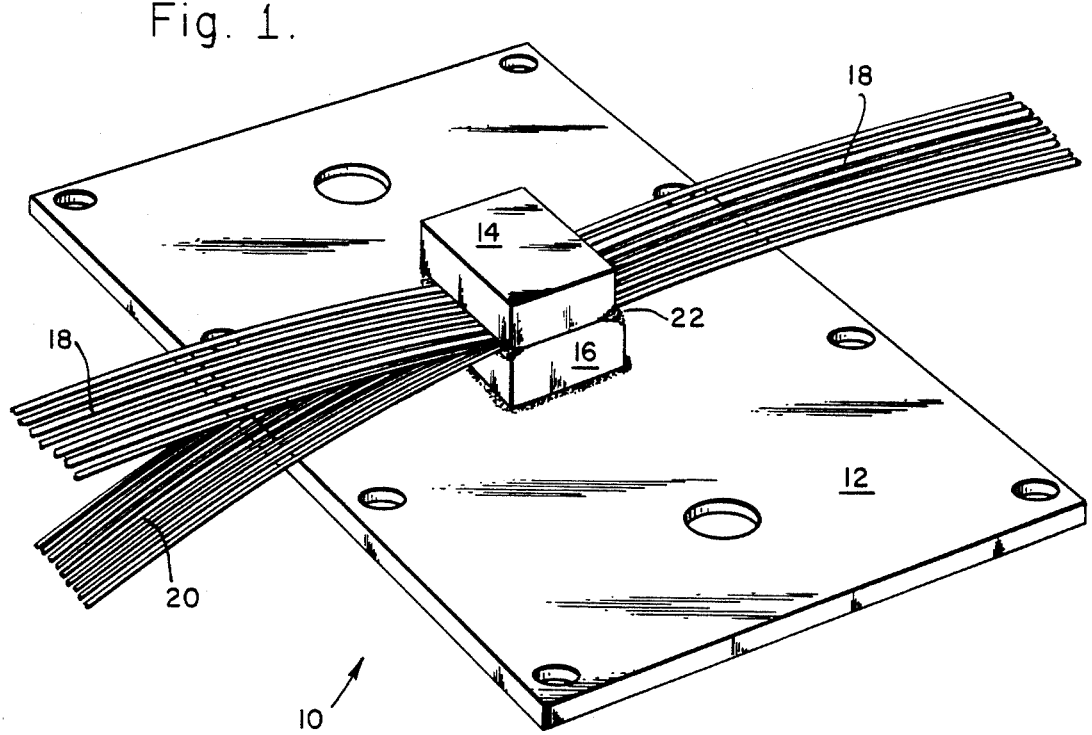
Fig. 2A.
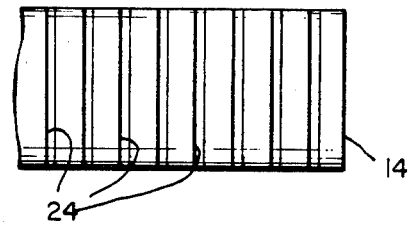
Fig. 2C.
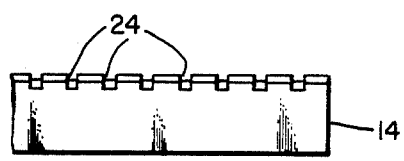
Fig. 2B.

Fig. 7.
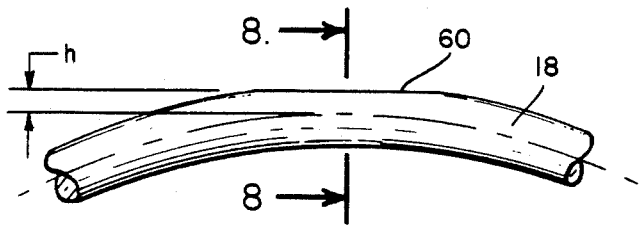
Fig. 8.
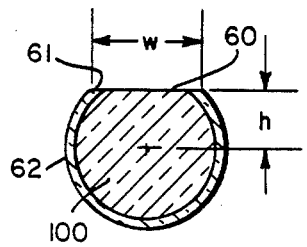
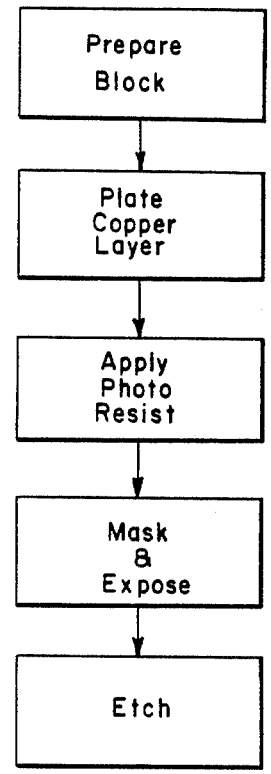
Fig. 10.
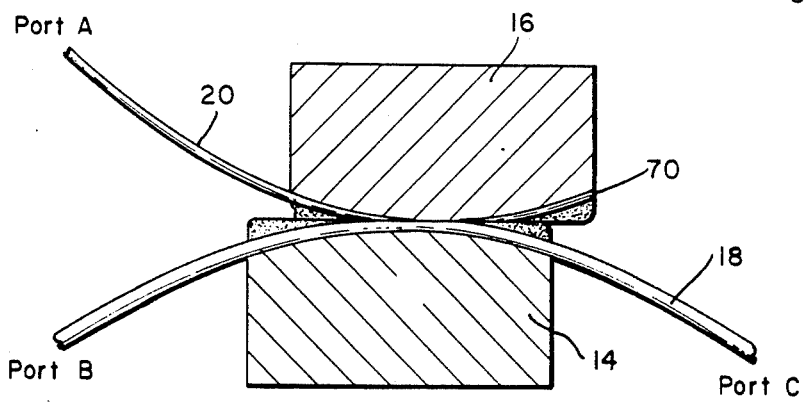
Fig. 9.

FIBER OPTIC COUPLER ARRAY AND FABRICATION METHOD

BACKGROUND OF THE INVENTION

1. Field of the Invention

This invention relates to the field of fiber optic devices and, more particularly, relates to an assembly and a method for fabricating the assembly for forming a plurality of optical couplers in an integrated fixture.

2. Description of the Prior Art

The use of optical fibers—so-called "light pipes'—has progressed in a relatively few years from laboratory curiosities to sophisticated optical communications and data transmission systems. The fibers function by transmitting light longitudinally along their flexible axis and are made of various materials having differing properties which are selected for specific uses.

Fiber optic couplers are well known to the art and generally involve the connection between two fibers by merging, fixing or otherwise combining the fibers along a common section. See for example: Barnoski et al, U.S. Pat. No. 4,054,366; McMahon, U.S. Pat. No. 4,021,097; Auracher et al, U.S. Pat. No. 4,089,583.

In considering fiber optic couplers, there is a basic distinction between unidirectional and bidirectional couplers. The unidirectional, or launch, couplers are three-port devices having optional fiber connections at each port. One of these ports is the input to the launch fiber, and the other two ports are opposite ends of a common fiber called the throughput fiber. One particularly effective launch coupler is disclosed in our copending application Ser. No. 123,034, filed Feb. 20, 1980 now U.S. Pat. No. 4,307,933.

Although end-to-end coupling devices for a plurality of fiber optics have been developed using a variety of differing approaches, including grooved block assemblies (see for example: Rocton, U.S. Pat. No. 4,079,927; Gauthier, U.S. Pat. No. 4,148,559; Cherin et al, U.S. Pat. No. 3,912,574; and Auracher et al, U.S. Pat. No. 4,111,522), no known prior art discloses an assembly for accommodating a large number of optical fiber couplers. In fact, most prior art couplers involve a relatively small number of fibers encased within a coupling package and are incapable of providing for a large number of independent optical couplers. Examples of these types of couplers and packages are shown in Milton, U.S. Pat. No. 3,933,410; Kao et al, U.S. Pat. No. 4,087,156; Gerndt, U.S. Pat. No. 4,113,345; Suzaki, U.S. Pat. No. 4,136,929; Dyott, U.S. Pat. No. 4,135,780; Tachiba, Japanese Pat. No. 52-24539; Serizawa, Japanese Pat. No. 54-118255; and Tsujimoto et al, "Fabrication of Low-Loss 3 dB Couplers with Multimode Optical Fibers", Electronics L., Vol. 14, No. 5, March, 1978, pages 157–8.

There is a definite need, therefore, for an assembly which is capable of forming and providing for a large number of independent optical coupling devices, which assembly can be easily made and still meet the demanding optical tolerances required by such couplers.

SUMMARY OF THE INVENTION

In brief, arrangements in accordance with the present invention comprise an assembly mounting a plurality of individual optical couplers in aligned relationship wherein each coupler includes an optical launch fiber and an optical throughput fiber. The assembly comprises a first block having a plurality of grooves formed in a first layer which is disposed upon a curved surface of the first block. Each of the throughput fibers is disposed in a corresponding one of the grooves of the first layer and held in place by a suitable epoxy. A second block is provided having a corresponding plurality of grooves formed in a second layer which is disposed on a curved surface of a second block. Each launch fiber is disposed in a corresponding groove of the second layer and held in place by epoxy. The respective epoxy elements and the launch fibers and the throughput fibers positioned therein are lapped to form opposed, optically flat, mating surfaces. The throughput fibers and associated epoxy resin are lapped to a predetermined depth, which lapping goes through the outer glass cladding and develops a preselected surface area of exposed core on each throughput fiber.

The launch fibers and epoxy resin on the second block are lapped to a depth such that the core of each lauch fiber is completely severed. The thickness of the launch fibers and the radius of curvature of the block are such as to develop specific elliptical flat surface areas selected to provide the desired coupling to the corresponding throughput fibers. In the assembly of the present invention, the corresponding launch and throughput fibers are aligned to provide optical coupling of light energy from the launch fibers to the throughput fibers. Since the respective fibers of each set of throughput and launch fibers are precisely positioned and the exposed core surfaces are formed identically, the mating and alignment of the fibers making up only a pair of couplers insures that all couplers of a given assembly are optimally aligned.

The invention also includes a method of fabricating the integrated assembly of optical fibers described above. Each separate block is provided with mating grooves to locate the respective fibers in proper position for establishing the desired coupling of individual fiber pairs upon final assembly. These grooves are preferably established by etching. In order to achieve the required accuracy (each fiber being positioned within ±0.5 mils), photolithographic processes are used.

In one preferred embodiment, photoresist is applied to the curved surface of an aluminum block, then exposed through a photomask. The photoresist is then developed and washed, leaving the groove areas exposed. The block is then placed in an etching solution where the exposed material is etched away to produce the grooves in the block. Each block is prepared in this manner. The width and depth of an individual groove depends upon the time that the block is maintained in the etching solution. If extreme uniformity of the grooves across the block is desired, it can be better achieved by plating a thin layer (0.5–1 mil thick) of another material, such as copper, on the aluminum block. By using a solution that etches the plated material but not the block material, an automatic etch stop is provided; that is, the depth of the grooves being etched is readily controlled and precisely limited. After the blocks are etched, a fiber is placed in each groove and epoxied in place. Where throughput fibers of larger diameter than the launch fibers are employed, the dimensions of the grooves in the respective blocks are correspondingly controlled. During curing of the epoxy, the fibers in the grooves of a particular block may be held in position by a specially designed fixture.

After curing of the epoxy, the fibers are lapped to the respective predetermined depths. In the lapping process for a given block, care must be taken to assure that all of the fibers are lapped to the same extent. This lapping requirement is met by maintaining the block parallel to the surface of the lapping device, such as a lapping wheel or other abrasive lapping surface. After the lapped fibers on the first and second blocks have been prepared to develop the desired optically flat surfaces of the combination of epoxy and fibers, the respective sub-assemblies are then placed in an alignment fixture. One fixture which is particularly suitable for use in this alignment step is the subject of our U.S. Pat. No. 4,302,267, entitled OPTICAL FIBER MATING APPARATUS AND METHOD. Light is applied as inputs to launch fibers at opposite ends of the mated blocks and the output ends of the corresponding throughput fibers are monitored as the blocks are aligned with each other. When the light outputs from both throughput fibers have been maximized, the coupler assembly is effectively aligned. The mating planar surfaces are then adhered together, utilizing an optically transparent epoxy resin.

In assemblies presently produced by the method described above, the center-to-center spacing between adjacent couplers is three times the diameter of the throughput fiber. At this spacing, no cross-talk between neighboring couplers is observed. Low cross-talk is important so that one coupler signal will not affect another. It is believed that the spacing between adjacent couplers can be reduced by approximately one-third— that is, to twice the throughput fiber diameter—without unduly increasing the cross-talk. With such a spacing arrangement, 50 couplers can be mounted within a volume 1 inch long by 0.5 inches by 0.5 inches deep. By suitable stacking of coupler arrays, 10,000 couplers would fit in a volume 10 inches long by 10 inches high by 0.5 inches deep.

BRIEF DESCRIPTION OF THE DRAWING

A better understanding of the present invention may be had from a consideration of the following detailed description, taken in conjunction with the accompanying drawing, in which:

FIG. 1 is a perspective view of one arrangement in accordance with the invention;

FIGS. 2 (A, B and C) is a set of orthogonal projections of a block for use in the arrangement of FIG. 1;

FIG. 7 is a side view of a throughput fiber prepared in accordance with the present invention;

FIG. 8 is a sectional view taken along the lines 8—8 of FIG. 7;

FIG. 9 is a sectional view of a portion of the assembly of FIG. 1; and

FIG. 10 is a block diagram illustrating particular steps in the process of fabrication of the arrangement of FIG. 1.

DESCRIPTION OF THE PREFERRED EMBODIMENTS

Figure 3A:
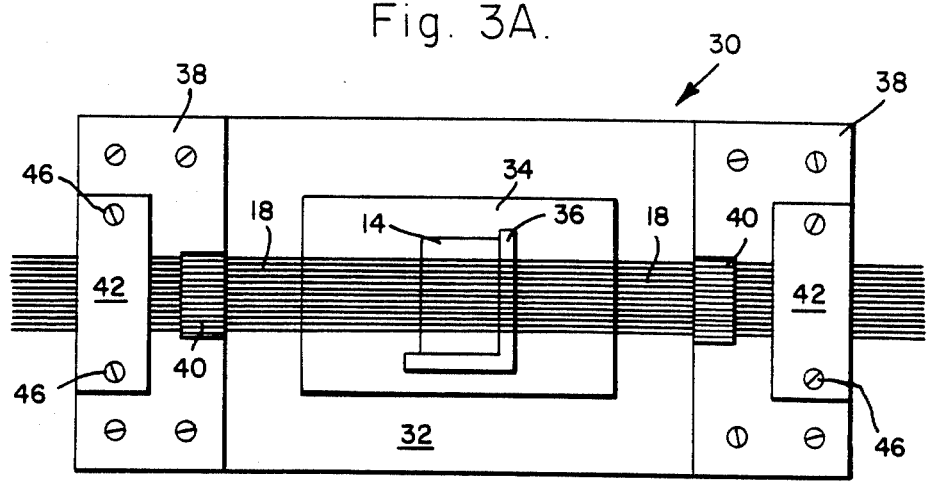
FIGS. 3 (A and B) is a set of orthogonal projections of a holding fixture with a portion of the invention in place shown in preparation for one of the processing steps in the fabrication of an invention embodiment.

As particularly shown in FIG. 1, an assembly 10 in accordance with the present invention comprises a base plate 12 having a plurality of holes, to facilitate mounting in alignment apparatus, and a pair of blocks 14, 16 to which pluralities of optical fibers 18, 20 are affixed. The lower block 16, to which the launch fibers are affixed, may be mounted to the plate 12 by any suitable means, for example by wax or adhesive (not shown). The upper block 14, to which the continuous throughput fibers 18 are affixed, is mounted to the upper surface of the block 16. Each of the blocks 14, 16 is fabricated with an optically flat mating surface lapped into a mound of epoxy resin, shown at 22. These mating surfaces are secured together by a suitable adhesive, such as epoxy, having the desired optical properties.

In a preferred embodiment of the present invention, represented by the assembly 10 of FIG. 1, each of the launch fibers 20 is aligned with and joined to a corresponding throughput fiber 18 to develop a launch coupler of the type disclosed in our aforementioned application Ser. No. 123,034.

Each of the blocks 14, 16 of the assembly of FIG. 1 has an arcuate surface on the side facing the other block and a plurality of longitudinal grooves formed therein for receiving the respective optical fibers 18 or 20. One such block, designated 14, is shown in orthographic projection in FIG. 2, views A, B and C. A plurality of grooves 24 is shown. These grooves 24 cut across the curved surface of the block 14, designated 26, are evenly spaced relatively close together and are of uniform depth. The depth is selected to correspond to the size of the optical fibers to be placed in the grooves. One may, if desired, form the grooves 24 by a selective etching process. We find it preferable to form these grooves 24 by the process described below in connection with the block diagram of FIG. 10.

Figure 3B:
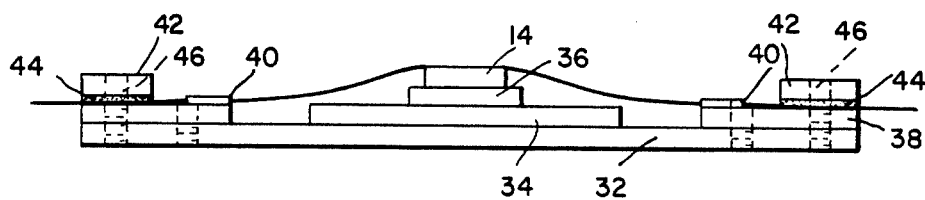

After preparation of the blocks 14 and 16 to develop the curved face 26 and grooves 24, each block is placed in a holding fixture 30 as shown in FIG. 3, containing the orthographic projections A and B.

The holding fixture 30 comprises a flat base plate 32, a central support plate 34 having an alignment member 36 thereon and a pair of end plates 38 suitably mounted to the base plate 32. Each of the end plates 38 has affixed thereto a plurality of small stainless steel tubes 40 (equal in number to the launch couplers to be included in the assembly 10). The holding fixture 30 supports a single sub-assembly comprising a single block and its associated optical fibers of the launch coupler assembly of FIG. 1. Separate holding fixtures 30 may be employed during the fabrication of the separate sub-assemblies, or the same holding fixture 30 may be used in succession for the preparation of the separate sub-assemblies.

During the fabrication of a given sub-assembly, a block such as 14 is placed in position on the central support plate 34 against the alignment member 36. It may be temporarily affixed in position, as by the use of double-sided tape on the underside of the block 14, or it may be held in position by the tension of the optical fibers which are positioned thereon. The requisite number of optical fibers such as 18 are then threaded through the tubes 40 and across the block 14 to lie in corresponding grooves thereof, thus extending from end to end across the holding fixture 30. Clamp plates 42, each being provided with a felt pad 44 on the under face thereof, are affixed in position, as by mounting screws 46, to retain the loose ends of the optical fibers 18. A mound of epoxy resin is then applied to cover the upper curved face of the block 14 and permitted to harden. This resin encases the fibers 18 within the grooves of the block 14, as shown in FIG. 4.

Figure 4:
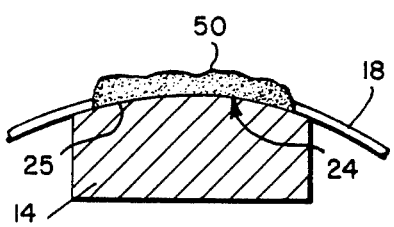
FIG. 4 is a sectional view of a portion of the embodiment during fabrication.

In the sectional view of FIG. 4, a block such as 14 is shown sectioned at one of the grooves 24. The bottom 25 of the groove 24 is shown with a fiber 18 curved along the curved face of the block 14 and held in that position by the epoxy 50.

Figure 5:
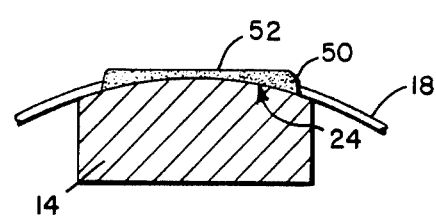
FIG. 5 is a sectional view as in FIG. 4, showing the section after a further processing step.

After the sub-assembly is prepared in this fashion with all fibers such as 18 in place within their respective grooves, the holding fixture 30 is used to position the upper face of the block 14 adjacent a lapping wheel which laps away the upper part of the epoxy 50 and predetermined portions of the fibers to develop an optically flat surface 52 as shown in FIG. 5.

Figure 6:
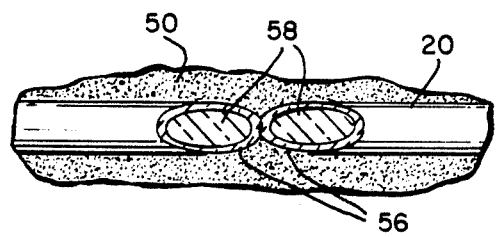
FIG. 6 is a plan view of a launch fiber prepared in accordance with the present invention.

Both the launch fibers 20 and throughput fibers 18 are lapped in similar fashion, although the details of the lapping may be somewhat different in order to develop the different degrees of lapping in the respective sets of fibers making up the launch coupler. The launch fibers are lapped to the degree indicated in FIG. 6, which shows a single launch fiber 20 that has been lapped, after mounting on the block 16 in the manner indicated in FIGS. 3 and 4, to produce elliptical flat surfaces 56 and 58. Surfaces 56 are the outside cladding of the glass-clad glass fiber and elliptical surfaces 58 are on the core of the fiber. It should be noted that the surface is planar, and that it is surrounded by the cured epoxy resin 50. It will be further noted that the points of the two ellipsoids 58 terminate apart from each other; that is, lapping is continued until a central core of the fiber is completely severed. To achieve this degree of lapping, necessary to sever the launch fiber 20, it may be necessary to lap partly into the block 16 at the crown of the arcuate face.

FIGS. 7 and 8 illustrate the degree of lapping of the larger throughput fiber in the sub-assembly including the upper block 14 (FIG. 1). In FIGS. 7 and 8, the epoxy resin and the arcuate mounting surface of the block have been eliminated for purposes of illustration. In these figures, a fiber 18 has been lapped to produce a horizontal flat surface 60 which is at a distance h from the center line of the fiber axis. It is preferable to limit the lapping to remove less than half of the thickness of the fiber core, in order to minimize the extent of signal lost from light travelling through the fiber. In addition, the exposed core surface area produced by the lapping of the fiber 18 should be equal to one of the exposed core surface areas 58 (FIG. 6) in order to maximize the coupling of light signals from the launch fiber to the throughput fiber.

In the sectional view of FIG. 8, the glass cladding is shown as 62. It will be noted that both the fiber and the cladding have been lapped to form flat surfaces 60 and 61, respectively. These produce a flattened core surface of width W. This width should correspond to the width of the core 58 exposed in FIG. 6, which is the core diameter of the launch fiber. Once the width W and the size of the launch fiber, along with arcs to be utilized in the support blocks, have been determined, mathematical calculations may be used to determine the specific cross-sectional areas, and thus the amount of lapping needed.

After lapping, and while still mounted on the aluminum blocks 14, 16, the sub-assembly units are mated together in the form shown in FIG. 9 (shown inverted, relative to FIG. 1). The ends of the launch fiber portions which are not to be used may be ground off at the block surface, as indicated at 70. In this form, the plurality of throughput fibers 18 are retained in the grooves 24 of the support block 14 and have the lapped surfaces 60. The launch fiber block 16 is displaced longitudinally so as to position the lapped end 58 of the remaining launch fiber portion 20 in alignment with the lapped surface 60. The sub-assembly units are preferably removed from the holding fixtures after the lapping is completed and prior to installation in the alignment fixture.

In particular arrangements in accordance with the present invention, the smaller, launch fiber is preferably less than 100, usually from 50 to 70, microns in core diameter. It is preferable that the ratio of diameters of the throughput fiber core to the launch fiber core be in the range of from 3:2 to 4:1, preferably within the range of 1.6:1 to 2.4:1. The optimum range for maximum effectiveness is 2:1. Thus, the throughput fiber core diameter may vary from approximately 100 to 400 microns, preferably from about 125 to about 250 microns, depending upon the size of the launch fiber which is used and the diameter ratios specified. Generally, glass-clad glass fibers are utilized, and the cladding size would not be considered in selecting the fiber size to be used in the practice of the invention.

The type of coating is not critical to the process or product of the present invention, but the process is directed to coatings which would remain after the lapping and joining in accordance with the present invention. Many commercially available single-strand optical fibers have a nylon buffer coating which is often stripped during coupler preparation; the resulting coupler devices may be too fragile for general use. In the process of the present invention, there is no need for stripping of the protective coating or the removal of the normal glass cladding, since the lapping steps remove all unnecessary extraneous components.

For fibers utilized in the present invention, the radius of curvature of the machined block on which the fibers are mounted should be between approximately 5 and 8 centimeters, preferably about 6 centimeters, but this can vary depending upon the fiber being used. The diameter of the fiber is a factor in determining the arc, since the lapping procedures in accordance with the present invention are to be performed very precisely. That is, the surfaces provided by the lapping should be as flat as possible in order to assure a good optical contact with uniform faces at all individual couplers. If too much curvature, in relation to the fiber diameter, is utilized it is possible to break the fibers. However, it is also desirable to maximize the surface area of the individual launch fibers, and thus a larger radius of curvature would result in a larger surface area being developed during the lapping step. Thus in manufacture, the selected curvatures would depend upon the particular fibers utilized, and the radius of curvature would be selected in order to maximize optical transmission without incurring production problems. It is preferable to use as small a radius as possible, but the larger fibers require a larger radius in order to avoid the above-mentioned problems.

A particular benefit may result from the addition of a glass particle filler in the epoxy applied to hold the fibers in place on the block. Without these particles, an ordinary epoxy resin, being softer than the glass fibers, would be lapped away from the surface at a greater rate than the fibers during the lapping step. The result would be a relief type of structure where the glass fibers project slightly above the epoxy. With the addition of the glass particle filler, which provides a reinforced epoxy having approximately the same hardness as that of the glass fibers, this relief effect is avoided. The result is that, in the lapping process, the epoxy is removed at the same rate as the glass cladding and glass core, and thus an even, smooth, flat surface is produced.

If glass beads are added to the epoxy composition, they should be sized so that the particles are not larger than the diameter of the smaller fibers. They may be included in the epoxy in bead diameters down to as small as 0.001 millimeter and may be present in amounts up to 20%, preferably from 5-10%, by weight of the epoxy mixture.

The lapping may be effected, for example, by the use of five-micron abrasive alumina powder in a water or oil supply. Lapping procedures are standard in the art and, on occasion, it is appropriate to use finer alumina or other powder. However, the particular powder used, after being selected as appropriate for the fiber size, is not critical.

Alignment of the two sub-assemblies is of great importance in order to maximize light transfer from the launch fibers 20 to the throughput fibers 18. This can best be accomplished by mounting the two separate sub-assemblies in the mating apparatus of our U.S. Pat. No. 4,302,267 and following the alignment procedures described therein. During this alignment procedure, light is applied as input to a pair of launch fibers 20 (Port A) at opposite ends of the sub-assembly, and the light output from the corresponding throughput fibers 18 is monitored at Port C. When both outputs have been maximized, the coupler array is properly aligned. Another layer of epoxy resin is then prepared and applied to the planar epoxy surfaces already in place and allowed to cure. This sets the bond between the two surfaces and holds them in a fixed, closely aligned, contacting relationship. After this final curing step, the assembly 10, as shown in FIG. 1, is complete. Further fabrication steps may include the preparation of respective fibers 18, 20 with suitable termination couplers, or the assembly may be installed in utilization apparatus, as desired.

During development of arrangements in accordance with the present invention, it has been found desirable to use a particular fabrication method for the respective blocks 14, 16 in the formation of the grooves in which the fibers 18, 20 are to be positioned. In one procedure, photolithography is used to achieve the accuracy needed. Photoresist is applied to the curved surface of the block and then exposed through a photomask. The photoresist is then developed, leaving the grooved areas exposed, after which the block is then placed in an etching solution. The exposed material is etched away, producing the grooves in the block as shown in FIG. 2. The width and depth of the grooves depend upon the time that the block is exposed to the etchant.

More uniform grooves across the block can be achieved by plating a thin layer (0.5-1 mil thick) of another material on the block. By using a solution that etches the plated material, but not the block material, an automatic etch stop is provided. This procedure is indicated in FIG. 10, which shows that after the block is prepared by forming the arcuate surface along the face on which the fibers are to be placed, a copper layer is plated thereon. Next a suitable photoresist is applied over the plated layer, covered with a photomask and exposed. Thereafter the block is exposed to etching with a copper etchant material. This etches grooves in the copper to the bottom of the plated layer but does not etch into the aluminum of the block. As a result, the grooves thus produced are all of uniform depth and, perhaps more importantly, the bottom of each groove is precisely and identically located as corresponding with the upper face of the curved aluminum block.

By following the fabrication methods disclosed herein, multiple-fiber launch coupler assemblies in accordance with the present invention are provided which achieve extremely good efficiencies and favorable characteristics. Light input at Port A (the launch fiber—see FIG. 9) exits from Port C with about 1 dB of loss (insertion loss), while very little light appears at Port B. Light entering Port B exits from Port C and light into Port C appears at Port B. In both cases, the loss is about 0.5 dB (throughput loss). Almost no light appears at Port A. Thus an extremely effective unidirectional (launch) coupler assembly is provided which occupies very little volume. With suitable fiber sizes and a spacing between couplers of twice the throughput fiber diameter, an assembly of 50 couplers can fit in a volume 1 inch long by 0.5 inches high by 0.5 inches deep, with stacking being possible to achieve the density noted above. Such an assembly provides a large number of couplers with similar characteristics and high isolation in a small volume. The couplers of a single assembly can be fabricated very readily, rapidly and at relatively low cost without sacrificing the high efficiency and uniformity which are desired.

Although there have been described above specific arrangements of a fiber optic coupler array and methods of fabrication thereof in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus providing a plurality of substantially identical optical fiber couplers in an integral assembly comprising:

a first sub-assembly including a first support block having an arcuate surface with a plurality of equally spaced grooves aligned in a circumferential direction across the arcuate surface and a plurality of first optical fibers positioned individually in corresponding ones of said grooves;

a second sub-assembly including a second support block having an arcuate surface with a plurality of equally spaced grooves aligned in a circumferential direction across the arcuate surface and a plurality of second optical fibers positioned individually in corresponding ones of said grooves;

portions of epoxy resin applied to each of said arcuate surfaces to at least partially encase the respective optical fibers positioned in said grooves;

the respective portions of epoxy and encased optical fibers being lapped to predetermined depths to develop opposed, mating, optically flat planar surfaces with the optical fibers being lapped to expose at least portions of the cores of the optical fibers along said planar surfaces, the exposed portions of corresponding fibers in the respective sub-assemblies being aligned to establish a plurality of individual couplers effective to couple light between fibers of one of said sub-assemblies and corresponding fibers of the other sub-assembly;

the fibers of said second sub-assembly being smaller in diameter than the fibers of the first sub-assembly and being lapped to a depth sufficient to sever said fibers; and means for affixing said sub-assemblies together with the respective fibers in said aligned relationship.

2. The apparatus of claim 1 wherein the respective fibers of each individual sub-assembly are arrayed side-by-side in an axial direction along the arcuate surface of the block thereof.

3. The apparatus of claim 1 wherein the second sub-assembly is positioned relative to the first sub-assembly so that only one set of severed ends of the smaller fibers contacts lapped portions of corresponding fibers of the first sub-assembly.

4. The apparatus of claim 3 wherein the unused portions of the smaller fibers are cut off adjacent the edge of the second support block.

5. The apparatus of claim 3 wherein the fibers of the first sub-assembly are lapped to a depth effective to expose uniform portions of each fiber core having a surface area and shape approximating the severed end of the corresponding fiber of the second sub-assembly.

6. The apparatus of claim 1 wherein the couplers are unidirectional couplers in which the smaller fibers of the second sub-assembly constitute launch fibers and the larger fibers of the first sub-assembly constitute throughput fibers.

7. The apparatus of claim 6 wherein the ratio of the diameter of each throughput fiber to the diameter of the corresponding launch fiber is between 3:2 and 4:1.

8. The apparatus of claim 7 wherein said ratio is between 1.6:1 and 2.4:1.

9. The apparatus of claim 6 wherein the throughput fiber core diameter is between 100 and 400 microns, and the launch fiber core diameter is up to 100 microns.

10. The apparatus of claim 9 wherein the throughput fiber core diameter is between 125 and 250 microns, and the launch fiber core diameter is between 50 and 70 microns.

11. The apparatus of claim 6 wherein each of the launch and throughput fibers is a glass-clad fiber.

12. The apparatus of claim 5 wherein the width of the planar surface on each first fiber core is substantially equal to the diameter of an individual second fiber.

13. The method of fabricating a plurality of fiber optic couplers in a unitary assembly comprising:

fabricating a first sub-assembly by forming a first support block to have an arcuate surface corresponding to a portion of a cylinder;

forming a plurality of like grooves across the face of said arcuate surface, aligned in the circumferential direction and spaced substantially equally side by side in the axial direction;

placing a plurality of identical first fibers in adjacent grooves of the first block;

placing an epoxy resin over said arcuate surface to encase the fibers along at least a portion within the grooves;

allowing the epoxy to cure; and lapping the epoxy and the fibers encased therein to develop an optically flat, planar surface, said lapping proceeding to a selected depth where a predetermined portion of the core of the fibers is exposed;

fabricating a second sub-assembly by repeating the steps specified for the fabrication of the first assembly in forming a second block and lapping the epoxy and second set of fibers thereon to make up said second sub-assembly, said second set of fibers being smaller in diameter than the fibers used in the first sub-assembly, the lapping step including lapping the second sub-assembly until the cores of the second set of fibers are completely severed;

joining the two planar surfaces of the first and second sub-assemblies facing each other;

aligning the exposed surfaces of opposing fibers of the first and second sub-assemblies; and adhering the first and second sub-assemblies together in aligned juxtaposition and light coupling relationship.

14. The method of claim 13 further including the step of positioning the second sub-assembly relative to the first sub-assembly so that only one set of the severed core ends is opposite the lapped portion of corresponding fibers in the first sub-assembly.

15. The method of claim 13 wherein the alignment step comprises applying light input to two fibers at opposite sides of the second sub-assembly, monitoring the light output at corresponding fibers of the first sub-assembly, and adjusting the first and second sub-assemblies until the light outputs at the two corresponding fibers are maximized.

16. The method of claim 13 wherein the steps of fashioning grooves in the support blocks comprise applying photoresist to the curved surfaces of the blocks, exposing the photoresist through a photomask, developing the photoresist to leave the groove areas exposed, and then etching the groove areas to a predetermined depth.

17. The method of claim 16 further including the steps of plating a layer of a different material on the curved surface of the block, and etching through said layer to form said grooves.

18. The method of claim 17 wherein the step of etching comprises applying as the etchant a substance which is effective to etch the plated material but not the block material.

19. The method of claim 13 further including the step of cutting off the unused fiber portions of said severed fibers of the second sub-assembly in the vicinity of the edge of their support block.

20. The method of claim 13 wherein the steps of fabricating a sub-assembly further include placing the block against a reference member in a holding fixture, threading opposite ends of the fibers through opposed sets of side-by-side tubes mounted on the holding fixture on opposite ends of the block while laying the plurality of fibers in corresponding grooves of the block, and clamping the fibers to the holding fixture at opposite ends thereof adjacent the sets of tubes and remote from the block.

21. The method of claim 20 further including applying the epoxy resin to the block and fibers, and allowing the epoxy to cure while the block and fibers are mounted in the holding fixture.

22. The method of fabricating a sub-assembly for a multiple coupler optical fiber array, comprising the steps of:

forming a support block to have an arcuate surface along one face with a plurality of substantially equally spaced grooves aligned in a circumferential direction across said surface;

placing the block in a support fixture at a reference position, said holding fixture having sets of alignment tubes mounted on opposite sides of the reference position;

threading a plurality of optical fibers through the opposed sets of tubes while laying the fibers in corresponding grooves of the block;

clamping the free ends of the optical fibers to the holding fixture;

applying epoxy resin to the curved surface of the block and the portions of the fibers along said surface; and permitting the epoxy to cure in place while the sub-assembly is positioned in the holding fixture.

23. The method of claim 22 further including the step of lapping a planar surface on said epoxy and at a predetermined depth to expose at least a portion of the cores of the fibers.

24. The method of claim 23 wherein the lapping is continued to a depth sufficient to sever the cores of the fibers to develop launch fibers for said array.

25. The method of claim 23 wherein the lapping is continued to a depth sufficient to expose a portion of the fiber cores but short of the central axis line of the fibers.

26. The method of claim 25 wherein the extent of lapping of the planar surface is selected to develop an exposed surface of each fiber core which is substantially equal in area and dimensions to the exposed surface of fibers to which the sub-assembly is to be joined in the optical fiber array.

27. The method of claim 24 or claim 26 further including the step of removing the sub-assembly from the holding fixture and placing it in an alignment device for alignment with a mating sub-assembly.

28. The method of claim 27 further including applying light inputs to a selected pair of fibers of one sub-assembly and monitoring the light output from the ends of corresponding fibers in another sub-assembly while adjusting the relative juxtaposition of the two sub-assemblies to maximize the monitored light output.

* * * * *